C. O. READ.
Machine for Making Wood Screws.
No. 516.
3 Sheets—Sheet 1.
Patented Dec. 15, 1837.
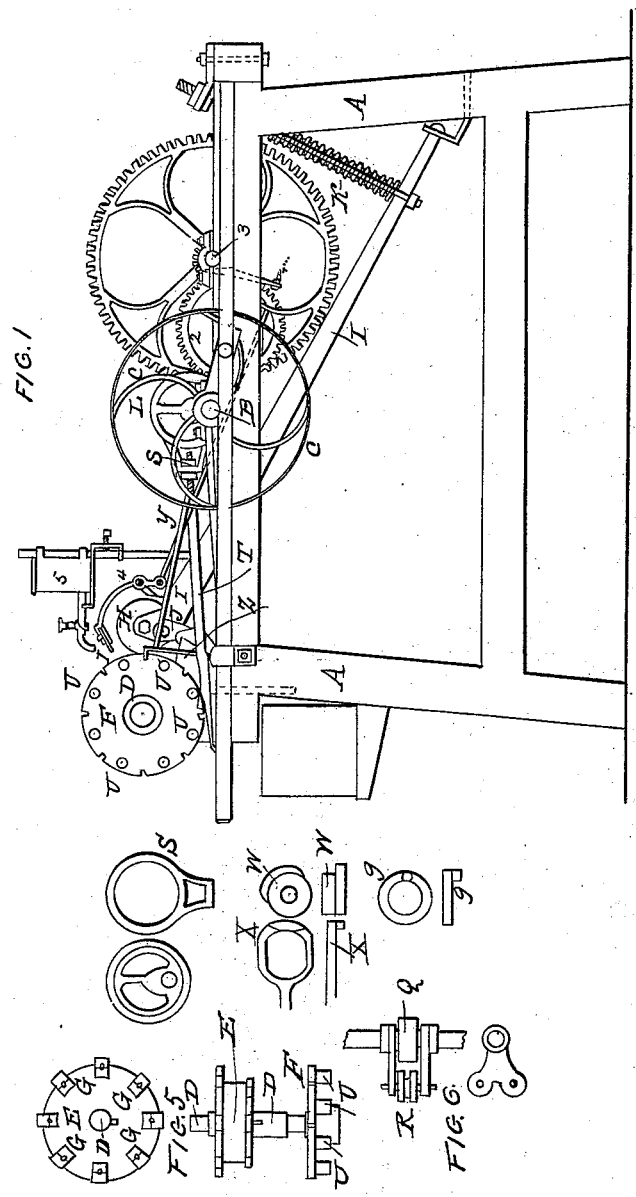

C. O. READ.
Machine for Making Wood Screws.
No. 516. 3 Sheets—Sheet 2.
Patented Dec. 15, 1837.
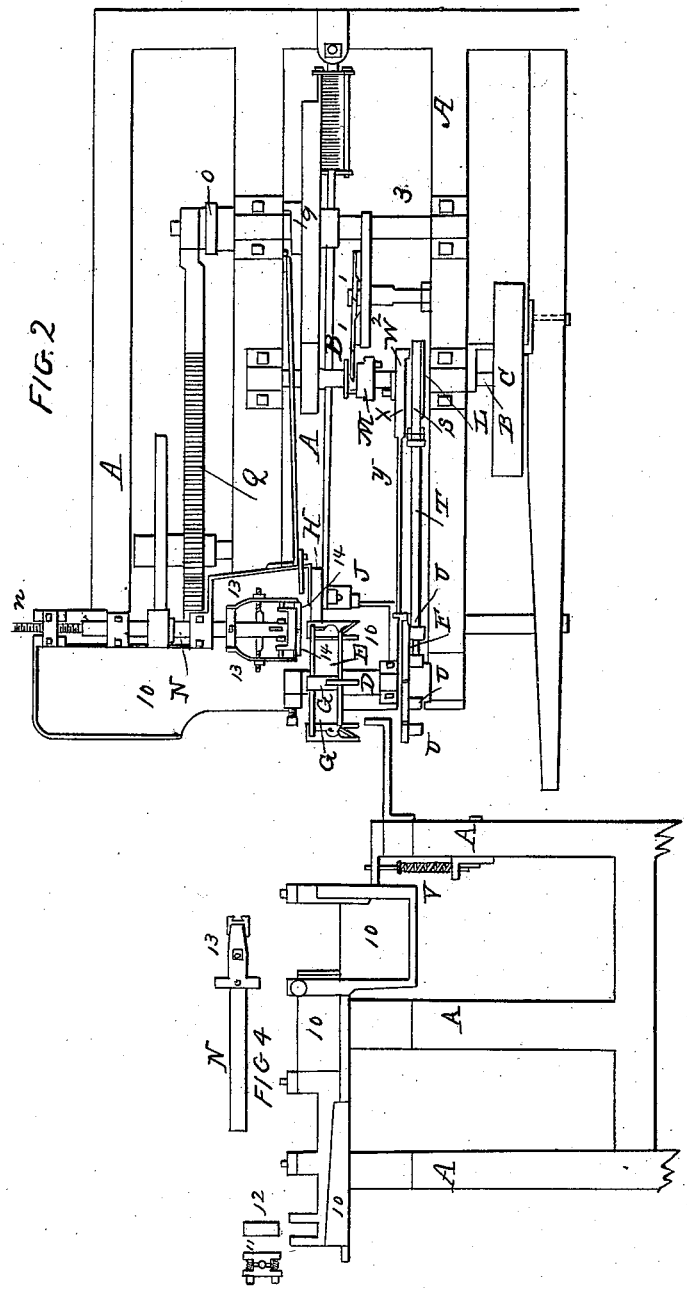

C. O. READ.
Machine for Making Wood Screws.
No. 516.
3 Sheets—Sheet 3.
Patented Dec. 15, 1837.
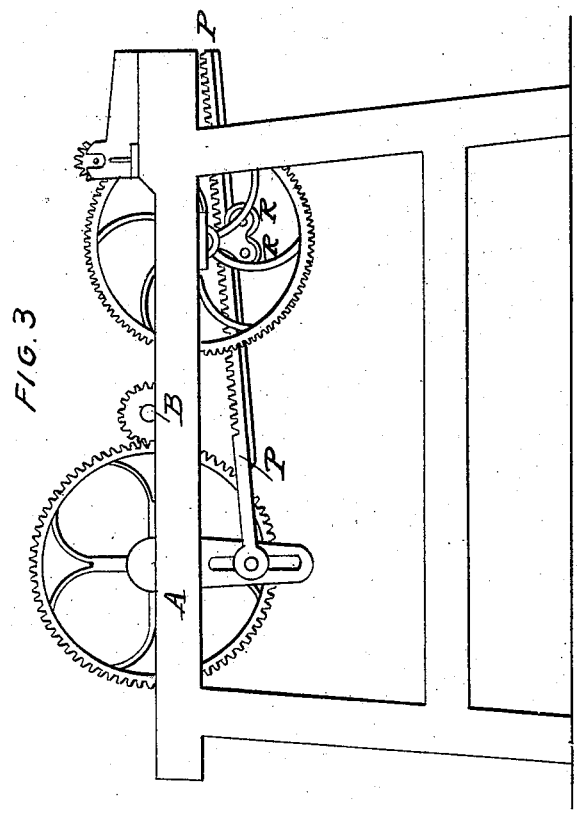

UNITED STATES PATENT OFFICE.

CLEMENT O. READ, OF PROVIDENCE, RHODE ISLAND.

IMPROVED MACHINE FOR MANUFACTURING WOOD-SCREWS.

Specification forming part of Letters Patent No. 516, dated December 15, 1837.

*To all whom it may concern:*

Be it known that I, CLEMENT O. READ, of the city of Providence, county of Providence, State of Rhode Island, have invented a new and useful Improvement in Machines for Manufacturing Wood-Screws, and I do hereby declare that the following is a full and exact description thereof, reference being had to the drawings which accompany and make part of this specification.

The improvement I have made is in that part of the machinery which is used for cutting the worm or thread of the screw, the preparation of the blank being effected by any of the machines used for that purpose; and the principal improvement in this machine consists in substituting a revolving-wheel on which to place jaws or other fixtures to hold the blank while the thread is formed, instead of stationary jaws, as have been heretofore used on machines where the thread is formed by revolving dies. By this improvement the operator is able to have a number of jaws on the same machine, which he can supply with blanks while the machine is at work. The necessity of any detention of the machine for the purpose of feeding is obviated, and he is also able to tend several different machines at the same time.

In the following description the same letter or figure refers to the same piece or part in all the different views given in the drawings.

The machine is supported by a frame, marked A A on the different figures. A cast-iron bed-piece 10 10, Figure 2, is placed on this frame, and on this is fixed the spindle N for the dies 14, and the wheel for the jaws and the several fixtures required for the same. The jaws G are usually eight in number. The lower or inside one of each pair is firmly screwed or affixed, at equal distances apart, into the surface of the cast-iron wheel E on the shaft D. The outside jaw is hung to the other by a joint near the center, so that it may freely open and shut to receive and discharge the screw. A feather-spring is placed between one end of the jaws in order to press the other end, where the screw is held, a groove being formed in this end of the jaws suited to the size and shape of the head of the screw. When the blank, after being placed between the jaws, is brought to the place for cutting the screw, the outer jaw is pressed firmly against the blank by the roll H, attached to the lever I. This lever is bolted to the stand J. The roll H is made to act against the jaws G with a force sufficient to hold the blank placed between them immovable while the thread is being formed. The force of the pressure is regulated by the spiral spring K at the opposite end of the lever I. The blank being thus held in the proper position for cutting, the screw is cut by the dies 14, fitted in a block fastened to the end of the spindle N. These dies are pressed against the blank by one end of the spring 13. The other end is fastened to a collar which may be moved along the shaft and the ends of the springs resting on the dies thus slipped off whenever the dies may require to be taken out for repairing or any other purpose. The pressure of the springs is regulated by a bolt passing through them and the spindle. A revolving motion backward and forward is given to the spindle by the crank O, rack P, and intermediate wheels, as may readily be seen by the drawings, Figs. 1 and 2. A leading-screw 11, of the requisite fineness, running in a pair of caps screwed together and forming a box 12, is attached to the spindle to cause the dies to traverse backward and forward on the blank in a proper manner. The form of the dies, springs, spindle, &c., is similar to those of machines already in use. The rack P is made to act directly from the crank O to the pinion Q, against which it is held by the rolls R, (see Figs. 3 and 6,) dispensing with the slide and sweep generally used, thereby avoiding a degree of friction and obtaining a more equable motion. The rack is moved to or from the center of the crank according to the number of revolutions required to cut a screw the desired length. The screw being cut, the next motion is to remove that screw and bring another to its place. This is done by causing the shaft and wheel on which the jaws are placed to revolve one-eighth of a revolution, thus bringing the next pair of jaws, in which the blank is previously placed, on a line with the spindle N ready for cutting. The manner in which this is effected is as follows: An eccentric L is placed loose on the main shaft B, of a size and sweep to give the required motion. Around this eccentric is fitted a ring S, with a projection on one side, to which the bar T is fastened by nuts or a screw. The opposite end of this bar acts against the pins U, eight in number, in the iron plate F. The bar is held up to the pins by the spring V, (see Fig. 4,) one revolution of the eccentric L turning the shaft D and fixtures thereon one-eighth of a revolution, and thereby bringing the blank in the next pair of jaws in the proper position for cutting.

To hold the shaft steady while the screw is being cut, a spring with a catch Z is made to drop into nicks cut in the edge of the plate F. This spring-catch is drawn and held out of the nicks while the plate is turning by a cam W, fastened to the eccentric L, acting on a ring or strap of iron X, which is connected with the catch by a rod Y.

Motion is given to the eccentric L at the proper time by a sliding clutch M on and turning with the main shaft B. This clutch is brought by the lever 1 sufficiently near to take hold of the cam W. This lever is hung on the stud of the wheel 2 and is moved to bring the clutch into gear by a knob screwed inside the rim that is attached to the wheel acting on the opposite end of the lever, and after remaining long enough for one revolution is brought back by the edge of the rim acting against the lever. This wheel 2, as may be seen, is carried by a small wheel on the crank shaft 3. These wheels may be of different proportions, as two to one, three to one, four to one, &c., according to the number of times it is desired to have the dies run over the blanks in forming the screw.

The wheels connecting the main and crank shafts may be in proportion either four or five to one.

In order to cut the screw smooth and with as little wear as possible to the dies, oil is applied to the screw during the process. A crooked arm 4 hung on a joint has a piece of sponge or soft leather 7 fastened to the end. Over this a vessel of oil 5 is placed, and by turning a cock 6 the oil is made to drop on the sponge or leather as fast as required. The leather is brought to touch the screw once to every revolution of the crank-shaft by a cam 9 on that shaft acting against one end of a small lever 8, (marked in the drawings by dotted lines,) and hung to the frame near the center of the said lever, the opposite end of which is connected with the aforesaid crooked arm 4 by a small rod, as seen in the drawings.

I do hereby declare that while I claim the general principle or mode of action of the revolving wheel when employed for holding the blanks for the purpose of cutting a screw thereon, I do not intend to confine myself to the exact mode of construction, the particular manner of confining the blanks, or the precise number that may be attached to the wheel, as herein shown, but to vary the same as may be found useful and proper, while the principle of action remains the same and similar results are obtained.

Most of the operative parts of the machine, as herein described, are such as are well known and used in other machines. I therefore do not claim them in their individual character as making any part of my invention; but What I do claim is—

The manner of feeding the machine by fixing the blocks to a revolving-wheel, and thereby bringing them to the proper position for cutting the screw without stopping the machine, as herein set forth.

In testimony whereof I, the said CLEMENT O. READ, hereto subscribe my name, in the presence of the witnesses whose names are hereto subscribed, on the 10th day of August, A. D. 1837.

CLEMENT O. READ.

Witnesses:
JOHN GORHAM,
ZENAS BROWN.